(12) United States Patent
Laursen

(10) Patent No.: US 7,431,552 B2
(45) Date of Patent: Oct. 7, 2008

(54) METHOD AND EQUIPMENT FOR MOVING A GROUP OF OBJECTS

(75) Inventor: Christian Finn Laursen, Himmelev Bygade 76, Himmelev, DK-4000 Roskilde (DK)

(73) Assignee: Christian Finn Laursen, Roskilde (DK)

( * ) Notice: Subject to any disclaimer, the term of this patent is extended or adjusted under 35 U.S.C. 154(b) by 20 days.

(21) Appl. No.: 11/407,298

(22) Filed: Apr. 19, 2006

(65) Prior Publication Data
US 2007/0003399 A1 Jan. 4, 2007

Related U.S. Application Data

(63) Continuation of application No. PCT/DK2005/000009, filed on Jan. 10, 2005.

(30) Foreign Application Priority Data
Jan. 8, 2004 (DK) ............................... 2004 00020

(51) Int. Cl.
*B60V 1/00* (2006.01)
*B60P 3/00* (2006.01)
(52) U.S. Cl. ...................... 414/458; 180/125
(58) Field of Classification Search ................ 414/458, 414/676, 495, 812; 180/125
See application file for complete search history.

(56) References Cited

U.S. PATENT DOCUMENTS

| 3,400,780 | A | * | 9/1968 | Kesling | 180/124 |
|---|---|---|---|---|---|
| 3,825,093 | A | * | 7/1974 | Burdick et al. | 180/119 |
| 4,427,331 | A | * | 1/1984 | Grebenstein et al. | 414/277 |
| 4,712,966 | A | * | 12/1987 | Gross | 414/458 |
| 4,790,715 | A | * | 12/1988 | Alexander | 414/489 |
| 4,844,681 | A | * | 7/1989 | Pierre et al. | 414/398 |
| 4,921,264 | A | * | 5/1990 | Duffy | 280/79.11 |
| 4,934,893 | A | * | 6/1990 | Johnson | 414/458 |
| 5,044,866 | A | * | 9/1991 | Harp | 414/495 |
| 5,374,151 | A | * | 12/1994 | Matthews | 414/392 |
| 5,417,539 | A | * | 5/1995 | van der Wal | 414/458 |
| 6,027,295 | A | * | 2/2000 | Geppert et al. | 414/12 |
| 6,460,827 | B1 | * | 10/2002 | Baucom | 254/2 R |
| 6,846,144 | B2 | * | 1/2005 | Justice | 414/12 |
| 7,275,345 | B2 | * | 10/2007 | Cosse et al. | 47/39 |

FOREIGN PATENT DOCUMENTS

| EP | 0 067 636 B1 | 12/1982 |
|---|---|---|
| EP | 0 098 064 A1 | 1/1984 |
| GB | 1 277 892 | 6/1972 |

\* cited by examiner

*Primary Examiner*—Saul J. Rodriguez
*Assistant Examiner*—Charles Greenhut
(74) *Attorney, Agent, or Firm*—King & Spalding

(57) ABSTRACT

A group of objects arranged in fixed relative positions on a floor is moved while conserving the positions of the objects relative to each other by: providing a rigid framework surrounding the group of objects and having supporting means for supporting each object as well as air cushion units; establishing supportive contact between each object and corresponding supporting means; lifting the framework as one rigid unit by activating the air cushion units; and displacing the framework.

39 Claims, 11 Drawing Sheets

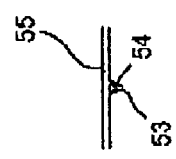
Fig. 13
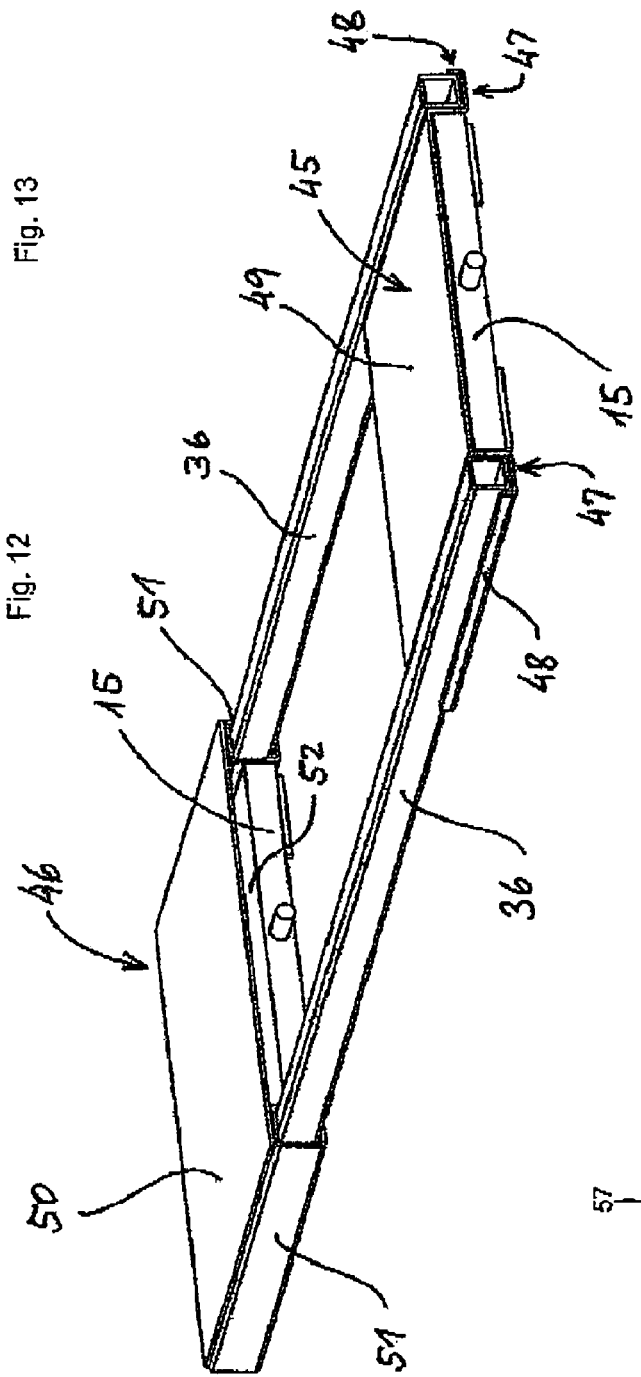
Fig. 11
Fig. 12
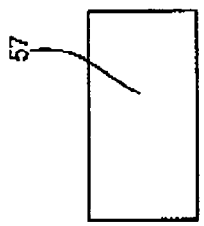
Fig. 14

METHOD AND EQUIPMENT FOR MOVING A GROUP OF OBJECTS

RELATED APPLICATIONS

This application is a continuation of PCT International Patent Application No. PCT/DK2005/00009 filed Jan. 10, 2005 and entitled "A Method and Equipment for Moving a Group of Objects," which claims priority to Denmark Patent Application No. PA 2004 00020 filed Jan. 8, 2004 and entitled "A Method and Equipment for Moving a Group of Objects." The entire disclosure of each of the above-identified related patent applications is hereby fully incorporated herein by reference.

TECHNICAL FIELD

The invention relates to a method and equipment for moving a group of objects arranged in fixed positions relative to each other on a generally planar supporting face, such as a floor, while conserving the positions of the objects relative to each other.

BACKGROUND

Many moving projects in industry relate to moving entire production lines or sections thereof. In the present specification, the term "production line" is to be understood in a broad sense, as any group of machinery, equipment, or furniture, the members of which are placed in accurate positions relative to each other. Thus, consecutive pieces of equipment or machinery in the group may, e.g., be lined up accurately relative to each other to be able to transfer between them items or products of the relevant process. Quite often, the pieces of equipment are resting on the floor but secured to one another by connective members, conveyors, or similar, as well as cables, wiring, and piping. Consequently, the relative positions of the pieces of equipment must be maintained in order for the group to function properly. The objects may be secured to the floor as well.

Moving of such production lines the traditional way includes disconnecting each object of the group (each machine, etc.) from supply lines and from consecutive pieces of machinery, often dismounting of fragile, protruding members of the machine, shifting the machine out from the production line, and moving the machine by traditional means. This method will almost certainly require involvement of personnel of several different skills, e.g., electricians, pipe fitters, mechanics, etc.

The largest disadvantage, however, of the traditional method of moving production lines is that the entire line will have to be re-aligned from scratch on its new location. This will very often indeed prove to be a very time-consuming and thus expensive project, again involving personnel of several skills and most often fitters from the original suppliers of the various machines in the production line.

The major part of these disadvantages would be avoided if it would be possible to move the entire production line as one or few "pieces" of machinery.

Moving of long and voluminous loads on air cushions is generally known, such as described in, e.g., U.S. Pat. No. 3,796,162 disclosing moving of large mobile homes along a production line on air cushions, guided by tracks on a floor (FIGS. 1-2), or GB Patent No. 1,277,892 disclosing moving elongate freight containers on modular air cushions which are inserted below the containers (FIGS. 22, 30, 43).

These loads are however of a self-contained and self-supported nature, even if they are elongate and voluminous or even very large.

SUMMARY OF THE INVENTION

An object of the invention is to provide a method and equipment for moving a group of objects, e.g., forming a production line, etc. of the categories mentioned without the need for disassembling the line and without the consequent need for reassembling and realigning it again.

This and other objects are met in that one aspect of the method of the invention comprises the following steps:

a. Providing a rigid framework, generally extending into the vicinity of the objects, and providing the framework with supportive members for supporting each object in the group of objects not supported in full by other of the objects;

b. Providing the framework with activatable displacement members for lifting and supporting the framework from the planar supporting face and enabling displacement along the face;

c. Establishing supportive contact between each object in the group of objects not supported in full by other of the objects and corresponding supportive members on the framework;

d. Lifting the framework supporting the objects as one rigid unit by activating the air displacement members;

e. Moving the framework generally horizontally on the supporting surface; and f. Optionally lifting the framework for further transportation, whereby g. The framework with the group of objects may be subject to any useful method of lifting and/or transportation.

By providing a rigid framework around the group of objects to be moved, and providing the framework with supporting members which support all objects needing support, the method of the invention allows all the objects to be supported directly or indirectly by the framework.

The term "rigid" is to be understood in a broad sense that is, rigid against downward deflection (flexural rigidity), rigid against torsion (torsional rigidity), etc. Different groups of objects may demand different forms of rigidity, or combinations thereof, or different degrees of rigidity.

The term "around" is to be understood in a broad sense as well. A general requirement to the framework is that it will surround, span, fill out or otherwise incorporate or embrace the group of objects to be moved, such that the framework will extend into the immediate surroundings of each and any of the objects to be moved, and at least into the vicinity of points on the objects, at which points the objects are to be supported.

Supportive contact between the supportive members and the objects may be established in several different ways; such that the objects are supported in a rigid manner and with an even distribution of load between the points of support.

Hereby, the group of objects supported on the framework will constitute one single object, which may be displaced, moved, or transported in any suitable manner, the necessary lifting forces and displacing forces of the process of movement now acting on the framework rather than on the objects in the group of objects themselves.

This method makes it possible to move the whole group of objects—or a sub-group of the objects—without disturbing the positions of the objects relative to one another.

By providing the framework with air cushion supportive members, supporting the framework from the planar supporting face (e.g. the floor), moving the framework with its load of objects becomes very easy, necessary horizontal displacement forces being easily provided by hand, when the air cushion supportive members are activated by means of compressed air in a manner generally known per se.

By this measure, the framework with its load of objects still arranged in their accurate relative positions is easily transported for as long as a floor or other planar and even surface extends. The necessary supply of compressed air may readily be provided along the path of the framework. Shifting a compressed air hose from one outlet to another poses no problem, as the framework will simply rest on the floor for as long as the compressed air supply is discontinued. Other solutions such as the use of a portable or mobile air compressor may be indicated by the skilled person.

According to one aspect of the invention, the framework is built up as a four-sided frame encompassing the group of objects.

The four-sided frame is generally convenient for many purposes: stowing, storing, etc., and quite many production lines will in fact fit nicely into an elongated four-sided frame. This form is also preferable per se for a lattice structure in that it greatly simplifies design and construction of a lattice of the required strength and rigidity.

According to another aspect of the invention, the framework is assembled from modular units.

The use of units to make up the framework allows the framework to be disassembled into relatively small and handy units or elements, even if these units may be rather heavy per se.

The use of modular units is further advantageous in that a small number of unit types may be sufficient for building the whole framework. This will simplify stocking and use of the units in that a small number of unit types will have to be stocked, and a small number of unit types will have to be brought to the workplace in order to have every type of unit at hand for erecting the framework.

Supportive contact between the framework and each object needing support can be established in an accurate and evenly load-distributing manner, in order to ensure that no distortion of relative positions of the objects (in three dimensions) takes place when the framework is lifted or otherwise manipulated.

That is, firstly, an appropriate number of supporting points can be chosen for each object in the group of objects to be moved; and secondly, supportive contact between these points and corresponding points on supportive members on the framework can be pre-loaded (or "pre-stressed") to an even degree before lifting or manipulating the framework. This method will ensure that an even or nearly even degree of loading is maintained when the framework is lifted or manipulated, as compared to the situation where the objects are resting on the floor, thus relieving the objects of undue stresses. The person skilled in the art will readily accept the appropriateness of these measures.

According to another aspect of the invention, supportive contact between suitable points on the objects and corresponding points on supportive members on the framework is established by blocking and/or shimming. This method is simple and easy to perform, and it is easy to estimate the pre-loading of a block or a pile of shims by simply twisting them by hand or with an appropriate tool.

According to another aspect of the invention, the supportive members of the framework are provided as straight cross members generally extending over the width of the framework below the objects to be moved; to provide blocking in the form of lengthwise extending beams resting on the cross members and having a suitable height, thus extending upwardly to just beneath the lowest points of support on the objects; and to build up piles of shims between the beams and the points of support on the objects.

The framework can be lifted to a certain height before establishing the supportive contact; this may be due to, e.g., irregularities in the supporting face or floor, demanding a certain free height below the framework when loaded with the group of objects.

Such lifting may be performed using the activatable displacement members themselves, thus eliminating the use of particular lifting tools. Supporting the framework momentarily while deactivating the displacement members, and blocking or shimming these members again will provide more free height. The process may readily be repeated.

The displacement members may each comprise a wheel arrangement and a lifting device, and air cushion elements can be used, which possess several desirable properties and only very few drawbacks for the purpose.

Air cushion elements allow displacement in every direction in the plane of the floor when activated by compressed air; they are easily controlled, e.g., by simply connecting them to one and the same compressed air outlet having a controllable pressure; they provide intrinsic load-distribution between them; they provide a very low friction, and the friction is completely indifferent as to direction of displacement and change of direction; and they are comparatively moderately priced compared to other possible solutions.

One of the drawbacks of air cushioned elements mentioned above is that air cushion elements will not handle even small steps, bulges, or depressions in the supporting face (e.g., the floor). Another drawback is that these elements demand that the floor, besides from being planar, even, and smooth, is free from sharp or pointed objects, whether these are fixed or loose.

According to the invention, the former drawback is overcome by a particular measure, which consists in smoothening away the irregularities by filling depressions or steps with sand or gravel, preferably oven-dried sand, smoothening out the sand, and covering the sand with a piece of iron sheet.

Experiments have shown that such dry sand has a load-carrying capacity which is quite sufficient for moving even large groups of machinery across moderate steps or bulges, and that the sheet of iron will secure the sand against deformation or scattering.

The edges of such sheets can be sealed with adhesive tape or similar, to avoid pressurised air blowing away any sand or gravel.

If the group of objects is to be subjected to further transportation by, say road or sea, extensive securing of the objects to the framework will most often prove to be preferable.

If this sort of transportation is to be performed in a freight or sea container, the framework can be secured inside the container in a safe and sturdy manner.

The objects of the invention are further met in that one aspect of the equipment of the invention comprises the following items:

a. A rigid framework;

b. Supportive members on the framework for supporting each object in the group of objects not supported in full by other of the objects;

c. Activatable displacement members for lifting and supporting the framework from the supporting face and enabling displacement along the face, and fit for being disposed below the framework in a supportive manner; and d. Optionally connective members on the framework for lifting the framework for further transportation.

The items a, b, and c serve corresponding purposes as explained above with reference to the method of the invention.

The optional connective members mentioned may be ring bolts, lifting eyes, or similar devices for receiving a crane hook or similar lifting tackle. When the framework—or indeed the various modular units for making up the framework—is provided with such connective members at various strategic points, the framework will be ready for lifting by means of conventional lifting tackle such as a lorry crane or a gantry crane.

Assembling the framework from modular units will provide corresponding advantages as explained above with reference to the method of the invention.

Adapting the modules of the framework—or a customized framework—to constitute a four-sided frame in the assembled state provide for similar advantages as explained above with reference to the method of the invention.

The framework and the supportive members can be adapted in such ways that the supportive members may readily be mounted onto the framework in various desired positions.

This measure will provide for the supportive members being mounted, e.g., in a more elevated position if one particular object in the group of objects to be moved does not have any suitable supporting points at a low height above the floor. Similarly, if the object has a very inclined shape, it may need supporting at different heights in each of its ends. Mounting the supportive members at corresponding, different heights above the floor will most likely facilitate supporting of that object.

The supportive members can be made extensible or otherwise adaptable as to their form, reach, and direction relative to the framework.

This aspect will enable appropriate support of irregular shaped objects to be moved. If suitable points of support are, e.g., found at very different distances from the framework on the various objects, or on different sides of one object, the supportive members can be placed with corresponding, different reach from the framework.

Likewise, the reach and direction of the supportive members can be adjusted before fastening them to the framework for good, such that as direct a contact as possible may be established between the supportive member and the object to be moved.

A particularly simple form of supportive members has been found to be straight cross members in lower regions of the framework, that is, supportive members extending crosswise over the width of the framework in a low height above the floor.

When the supportive members extend from one side of the framework to the other, any moment of torsion or tilt produced by the supportive members on the framework will be significantly reduced, because the members are supported at each end.

The equipment of one aspect of the invention comprises blocks, beams, and/or other blocking material and/or shims, for establishing supportive contact between the objects and the supportive members.

As stated above with reference to the method of the invention, an even loading on the various points of support of the objects to be moved can be established, in order to conserve the relative positions of the various objects. Any uneven loading on these points—which corresponds to an uneven and/or non-synchronous lifting of the group of objects to be moved—will tend to distort the relative positioning between the objects, which will tend in turn to stress unduly the objects or the structures interconnecting them.

The framework and the displacement members can be adapted so that the displacement members are mountable onto the framework in various desired positions.

The purpose of the displacement members is to support the load of the framework plus the objects to be moved, as well as eliminating friction between the framework and the floor for the purpose of lateral displacement. As most types of displacement members are designed to function within a specific nominal load interval, the load can be shared between the displacement members in a way allowing for this; in most cases, by sharing the load equally between the displacement members.

According to another aspect of the invention, the load is shared between the displacement members by shifting their positions underneath the framework, such that heavy sections of the framework will be supported by many displacement members, and lighter sections supported by fewer members.

According to another aspect of the invention, this loading can be achieved by making the displacement members mountable onto the framework in several different positions.

In this connection, the activatable displacement members can be mounted—or at least mountable—near and below the supportive members.

As the supportive members are carrying the weight of the objects to be moved in the first place, this measure will reduce the stresses in the framework, as a lower part of the load will have to be transmitted horizontally through the framework from a supportive member to one or more displacement members.

The vertical position of the framework relative to the activatable displacement members can be adjustable, e.g., by means of blocking and/or shimming.

By this measure, it is ensured that the framework with the group of objects may be raised in order to negotiate a floor or similar which is not sufficiently planar.

Lastly, the displacement members can be air cushion elements and the equipment can comprise a system for supply of compressed air.

Such elements are distinguished by almost no friction between the elements, when activated by means of compressed air, and the floor, and further, such elements possess no friction or resistance against changes in direction of movement, as do, e.g., wheels with rubber tyres.

The supply of compressed air may be a compressed air distributing network on the premises of the owner of the machinery, but a portable compressor can be incorporated into the equipment of this aspect of the invention. This combination will allow convenient control over air quality, pressure, flow capacity, etc.

These and other aspects, objects, and features of the invention will become apparent from the following detailed description of the exemplary embodiments, read in conjunction with, and reference to, the accompanying drawings.

BRIEF DESCRIPTION OF THE DRAWINGS

In the following, the invention will be explained in more detail by means of embodiment examples and with reference to the schematic drawings, in which:

FIG. 11 shows two alternative mountings of activatable displacement members on a double supporting member; the displacement members are in a lowered state.

FIG. 12 shows an irregularity in the supporting surface, the irregularity filled with a dry powder and covered with a solid sheet;

FIG. 13 shows a connective member for use when lifting the framework during transportation; and FIG. 14 shows a container for use during transportation of the group of objects.

Throughout the drawings, same reference designations refer to same or similar (corresponding) items.

DETAILED DESCRIPTION OF EXEMPLARY EMBODIMENTS

Figure 1:
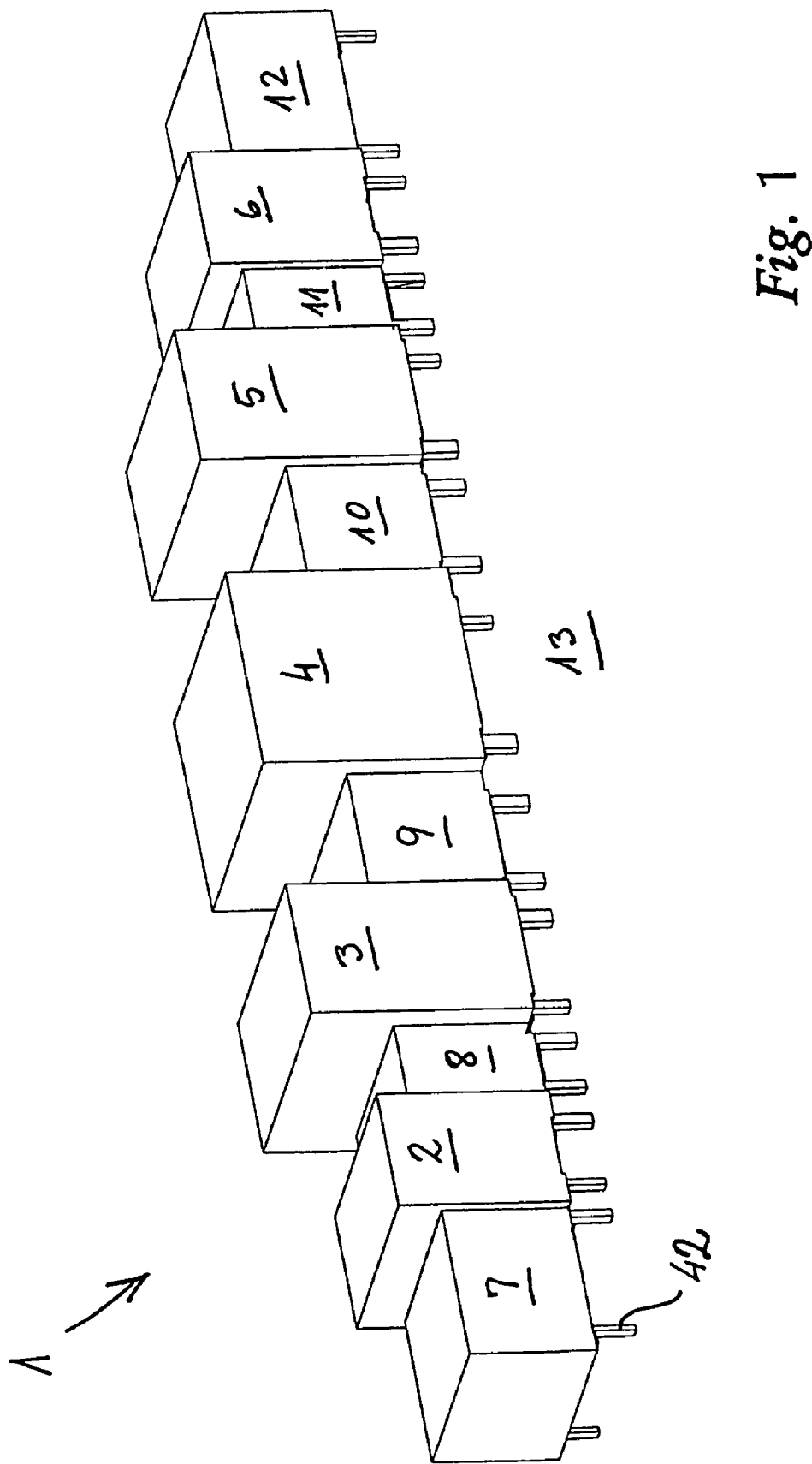
FIG. 1 is a perspective view of a group of objects to be moved, in the form of a processing line for sorting mail in a mail sorting office.

In FIG. 1, a processing line 1 in a mail sorting office or similar comprises machines 2-6 for processing mail, for example, sorting letters, etc., according to size and weight, or contents of the address, for example, a postal code or even the address proper.

These machines 2-6 are interconnected by handling or transporting devices 7-12 for receiving, delivering, or otherwise handling the letters, etc., and forwarding them from one machine in the line to the next. Most often, such devices form physical interconnections from one machine to the next.

All the machines and devices shown are resting on a floor 13 through legs 42, but apparatus like the devices 7-12 may very well be resting on the machines which they interconnect.

This mail processing line is just one example of the various forms of groups of objects that can be moved with the method and the equipment of the invention.

The objective of the method and the equipment of the invention is to lift from one place, displace, transport, and lower into another place this entire group of objects (processing line 1), without disturbing the positions of any of the objects 2-12 relative to each other, not even "in the least".

Figure 2:
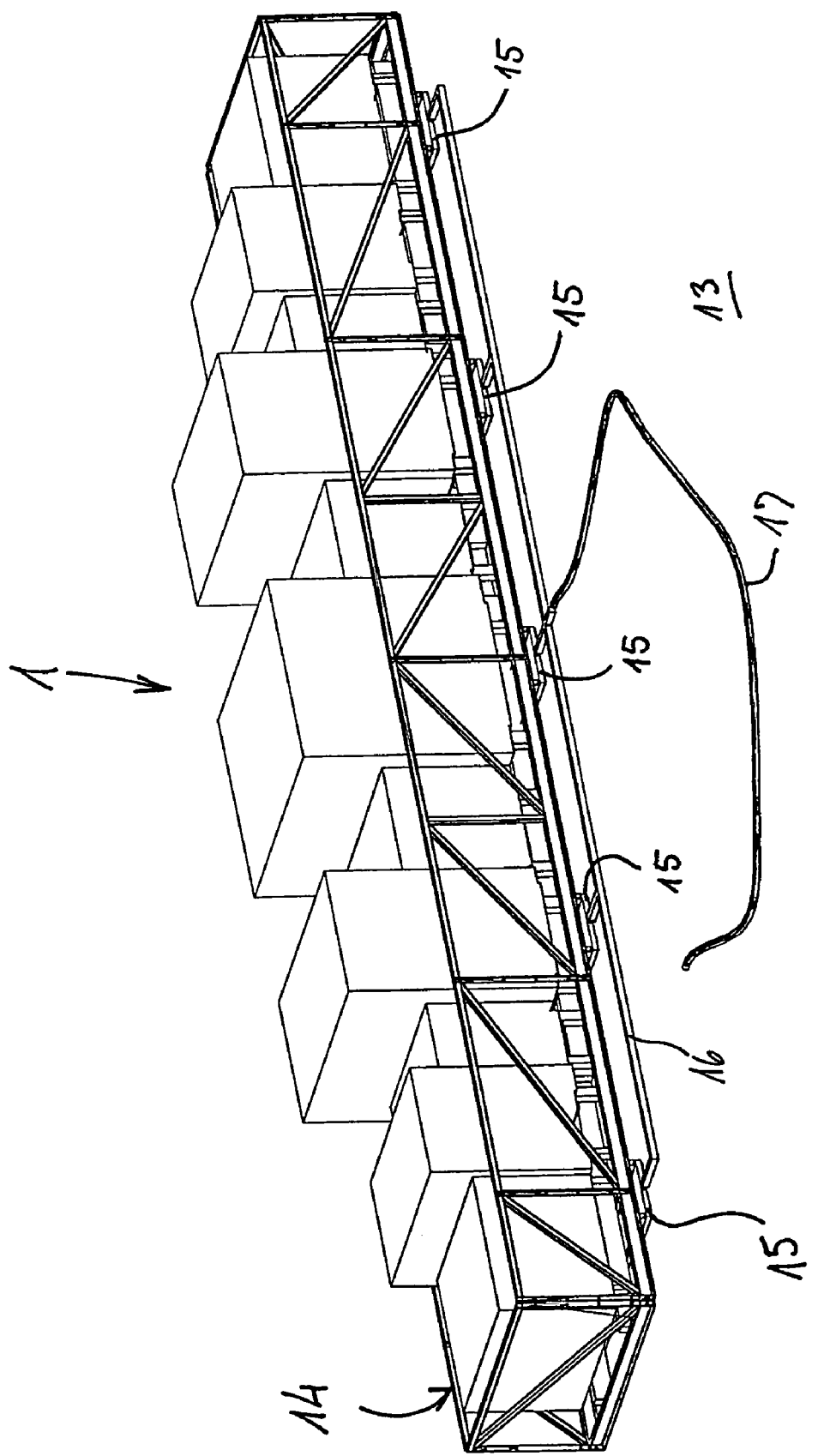
FIG. 2 shows the processing line of FIG. 1, encompassed by a set of equipment of the invention, ready for moving.

In order to meet this objective, a framework 14 is according to one embodiment of the invention built around the entire processing line 1, and provisions are made for supporting each and any of the objects 2-12 in the processing line 1 from this framework 14; please refer to FIG. 2.

The framework 14 is in turn supported from the floor 13 by means of displacement members 15, which in the embodiment shown are constituted by air cushion elements, which are activated by means of compressed air supplied to the displacement members 15 through an air hose 17 and an air manifold 16, from a suitable source of compressed air.

When the displacement members are activated this way, and the framework with the entire production line thus lifted, the production line may be shifted laterally on the floor by means of very little lateral force due to the very low friction indeed provided by the air cushions between the floor 13 and the framework 14.

The framework 14 is preferably provided with means such as lifting eyes (not shown) or similar for allowing lifting of the framework, complete with the entire production line, displacement members, supportive members, etc., by crane or other lifting means. The person skilled in the art will be able to design such means; a position of such means will most often be on a top horizontal stretcher 19 of the framework 14 in the immediate vicinity of a vertical post 20 or 21 and a brace 22; please refer to FIG. 3.

According to an exemplary embodiment of the invention, the framework is rigid. The framework is thus designed with a rigidity significantly higher than merely needed for supporting and carrying the load of the production line in a safe manner.

With a view to the requirement mentioned above, that the positions of the objects 2-12 relative to each other should not be disturbed even "in the least," the framework is designed with a very high rigidity providing for a very small deflection indeed when the framework is supported (lifted) by the displacement members or suspended from the lifting eyes, respectively.

Zero deflection will of course not be obtainable, in particular not when suspending the framework from a quite low number of wires or chains from a crane or similar. But an insignificant deflection may very well be obtainable by over-sizing the framework to an appropriate degree. A deflection of, e.g., one centimeter of a framework supporting a processing line having a length of, say, eight meters might very well be acceptable, and a framework with a corresponding rigidity may readily be provided by simply over-dimensioning the framework correspondingly.

Figure 3:
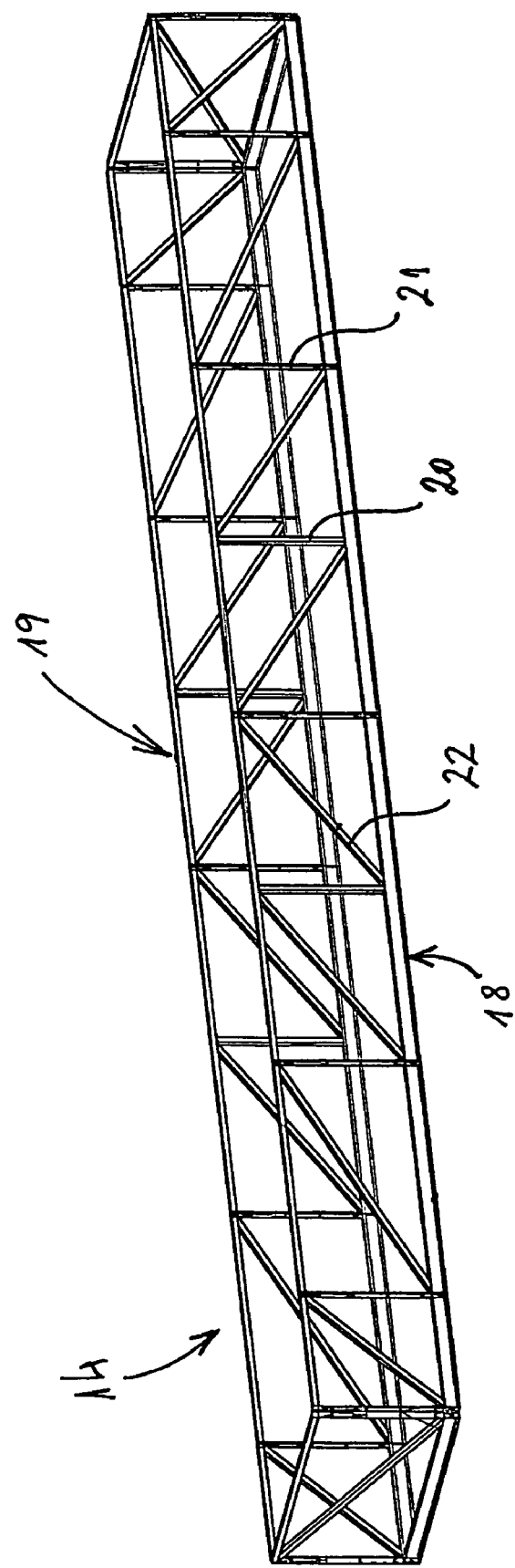
FIG. 3 shows the framework of the equipment of FIG. 2, in an assembled state.

FIG. 3 shows the framework 14 of the embodiment shown in the drawings. In this embodiment, the framework constitutes a four-sided "frame" or a box without top and bottom, and of a lattice-girder type of structure. The general form of the framework 14 thus falls within a parallelepipedic.

In general, the framework is that it will surround, span, fill out, or otherwise incorporate or embrace the group of objects to be moved, such that the framework will extend into the immediate surroundings of each and any of the objects 2-12 to be supported; and the framework is of such a sturdiness and rigidity that it will support the entire group of objects 2-12 without any significant deformation of the framework 14, when the objects are lifted from their support (which is, e.g., the floor 13).

In FIG. 3, the lattice of the framework comprise a through bottom rail (lower chord) 18, a through top rail (upper chord) 19, vertical posts 20 and 21, and diagonal braces 22.

According to an exemplary embodiment of the invention, the framework is preferably assembled from modular units. This aspect of the invention is illustrated in FIG. 4, which shows the framework 14 in FIG. 3 disassembled into four types of modular units 23-26.

Figure 4:
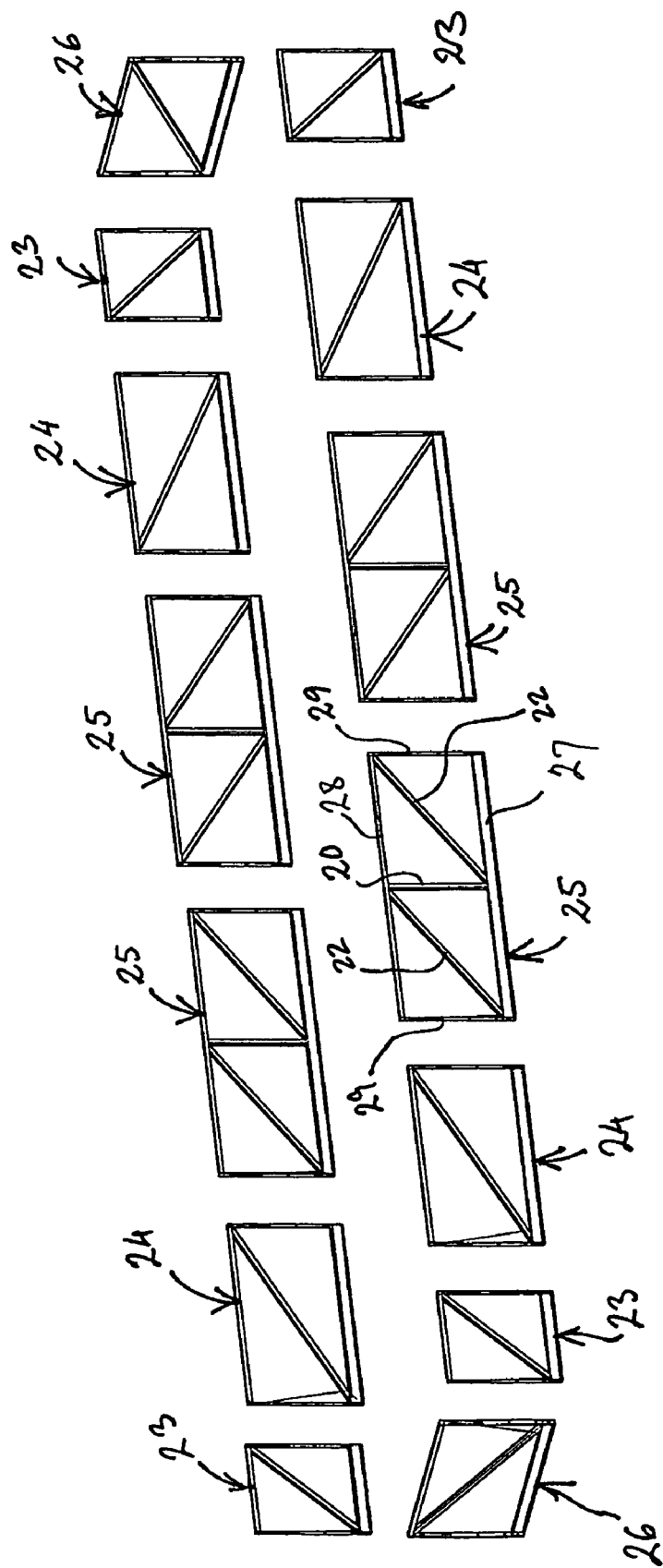
FIG. 4 shows the single modules forming the framework of FIG. 3.

The types of modular framework units shown in FIG. 4 are: a short side module 23; a medium side module 24; a long side module 25; and an end module 26. In the embodiment shown in FIG. 4, each module is built from a bottom horizontal member 27, a top horizontal member 28, two end posts 29, a number of braces 22, and optionally a number of intermediate posts 20.

When the modular units 23-26 of the embodiment shown are assembled into a framework 14, the end posts 29 of consecutive modules are bolted together to form compound vertical posts 21, and so the top horizontal members 28 of the modules will together form the through top rail 19 of the framework, and the bottom horizontal members 27 will form the through bottom rail 18.

Prior to moving the objects, the framework 14 must be erected or "built" around the objects. The framework 14 will not necessarily surround the objects of the production line 1 in the manner illustrated in the drawings. The main point is, however, that the framework 14 extends to the immediate vicinity of all the points at which the group of objects is to be supported.

For any given group of objects, a number of points must thus be defined, in which the objects are sufficiently solid or tough to be supported without risk of distortion or overstressing. Obvious usable points are the legs or supports of each object, but as these are already resting on the floor, they are not accessible for supporting from below. The immediate surroundings of such legs or supports will often prove to be useful for supporting the objects, however.

Figure 5:
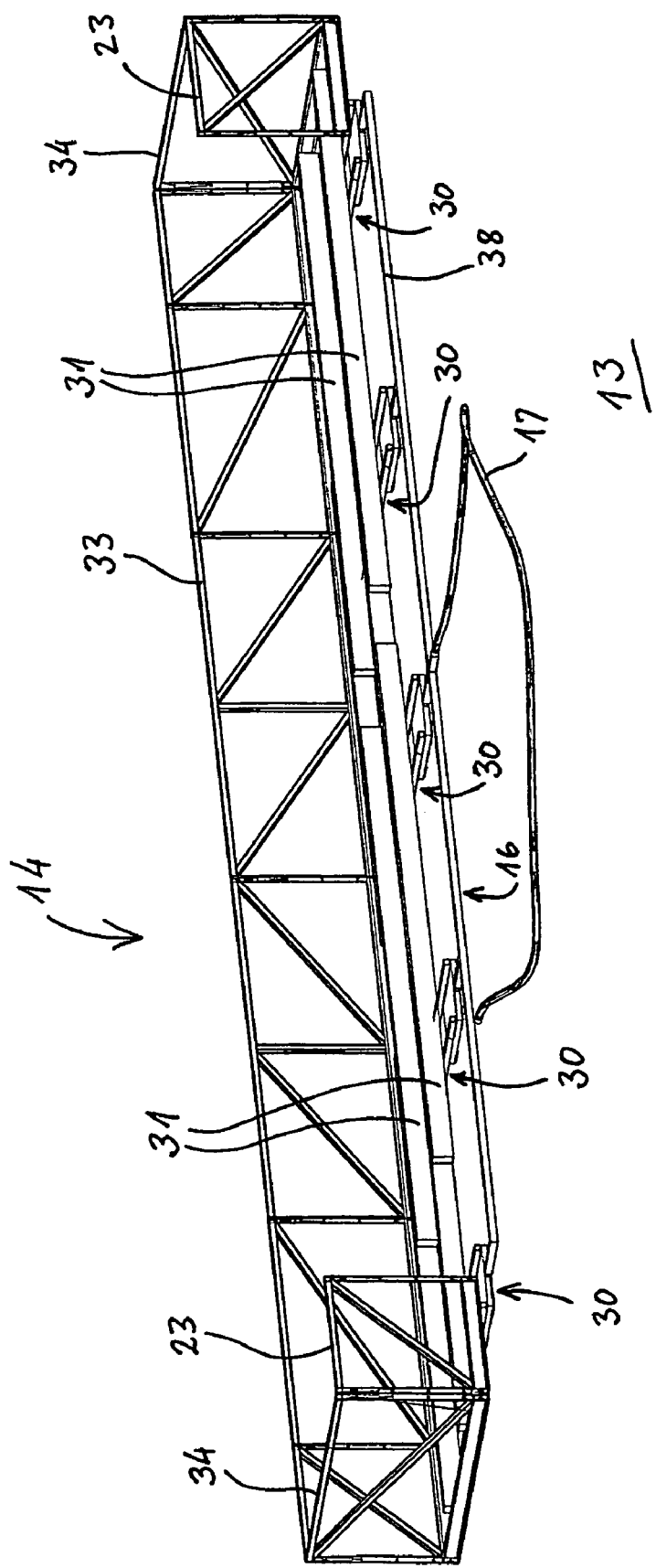
FIG. 5 shows the framework of FIG. 3 during erection, mounted onto four pairs of displacement members of the invention with supportive members of the invention.

One particular embodiment of the method of the invention will now be described in more detail:

FIG. 5 illustrates one of the steps in the erection of a framework according to the invention around the group of objects in FIGS. 1-2 (the objects are not shown in FIG. 5). In FIG. 5, five supportive members 30 have initially been placed on the floor 13 below the production line 1 (which is not shown), and four beams or planks 31 have been laid upon the supportive members to form an intermediate blocking between the supportive members 30 and the objects 2-12 to be moved.

In the embodiment shown in the drawings, supportive members 30 form lower cross members in the framework 14, and the activatable displacement members 15 to lift the framework are mounted underneath the supportive members 30; please see below for further description of this embodiment.

In FIG. 5, the framework 14 is in the process of being erected, and a first long side 33 has been erected on the rear side of the production line 1 (not shown); two end sides 35 have been erected at each their end of the production line 1; and a second long side 34 is in the beginning of being erected, two short side modules 23 having been mounted to the end sides 34.

Figure 6:
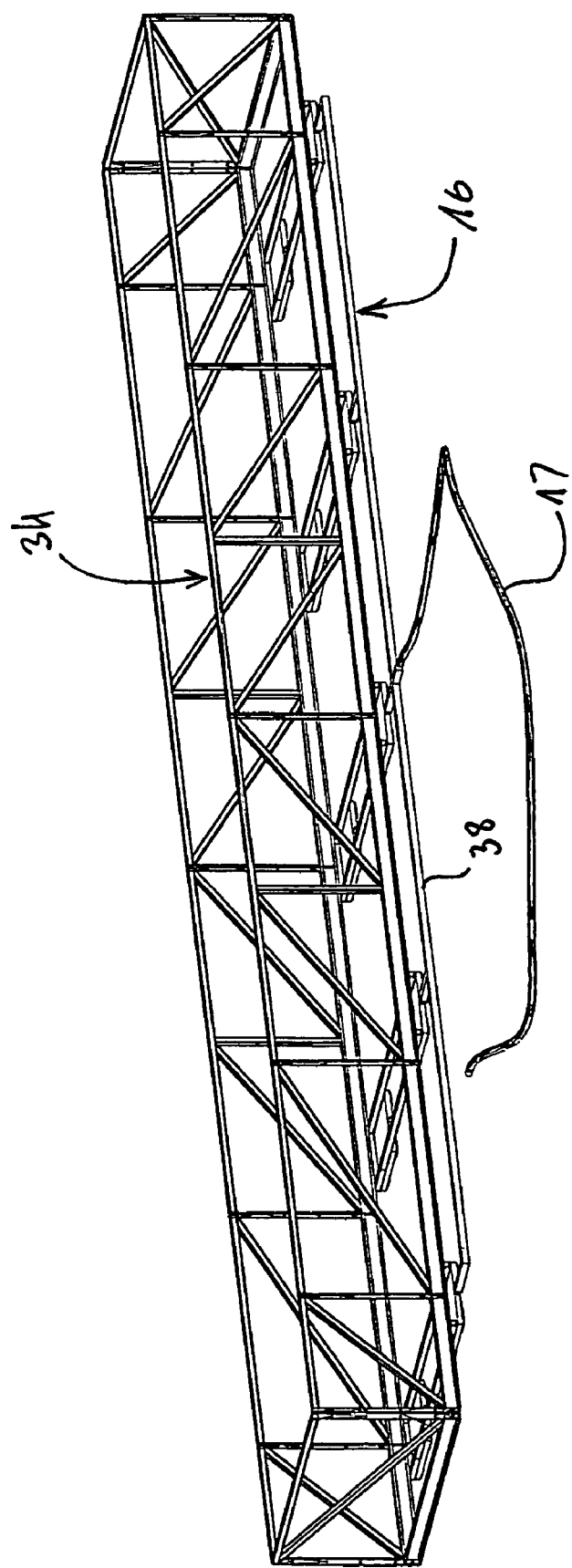
FIG. 6 shows the assembled framework of FIG. 3, mounted onto the displacement members and supportive members of FIG. 5.

In FIG. 6, the second long side 34 has been finished, and the framework is thus ready for its use according to the invention.

In order to provide for an ample supply of compressed air to air cushions (not visible in FIGS. 5-6) constituting the displacement members 15, an air manifold 16 has been provided in the form of tubing 38 connecting the supportive members 30 with an air hose 17. The latter is being connected to a suitable supply of compressed air, such as a compressor or any other available air supply system.

The framework in the drawings is supported by ten displacement members 15; please refer to FIGS. 7-10.

Figure 7:
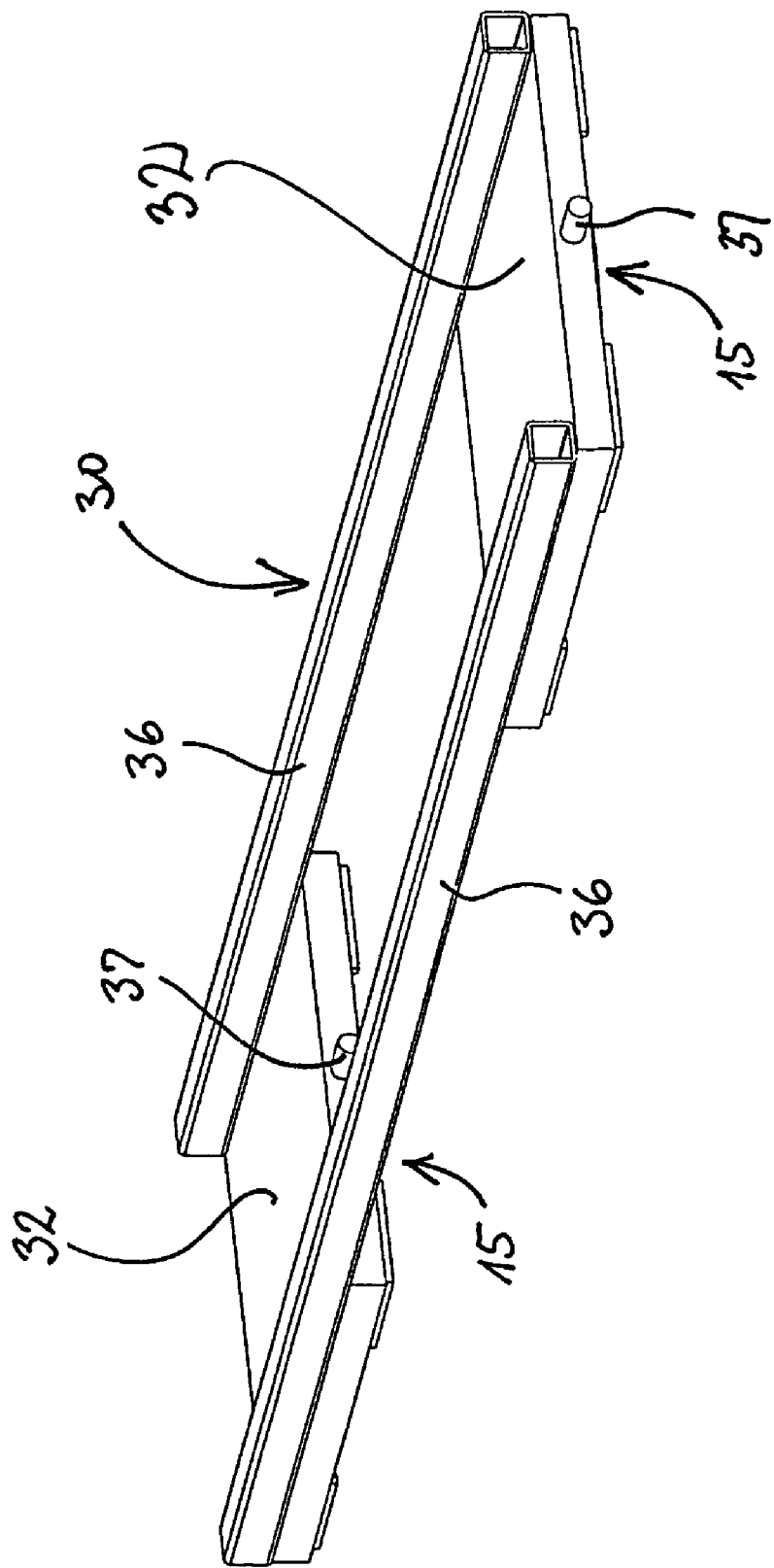
FIG. 7 shows one pair of displacement members with one double supporting member in a lowered state.

FIG. 7 shows one supportive member 30 of the invention, comprising two lower cross members 36 and two carriers 32. The lower cross members 36 are made from square steel tubing in the embodiment shown. Each of the carriers 32 is provided with an air cushion 15 on its lower side facing the floor, and an air inlet socket 37 on one of its sides. The above-mentioned air manifold 16 is connectible with this socket.

Figure 8:
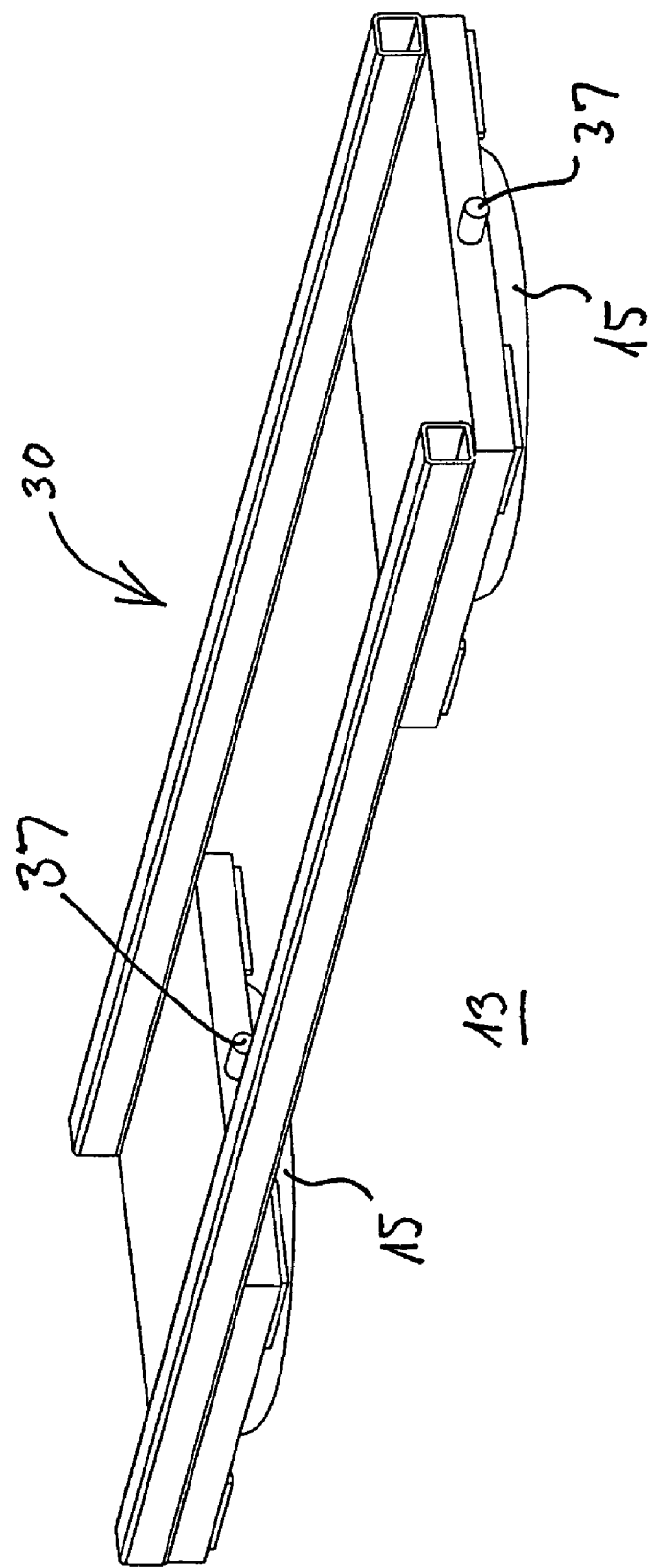
FIG. 8 shows the displacement members and supporting member of FIG. 7, in a lifted state.

In FIG. 8, the supportive member 30 in FIG. 7 is shown with its air cushion elements 15 activated by letting in compressed air through the air inlet sockets 37. It appears that the air cushion elements 15 are now inflated so as to lift the supportive member 30 together with its load of the framework with the group of objects 1 clear of the floor 13.

Figure 9:
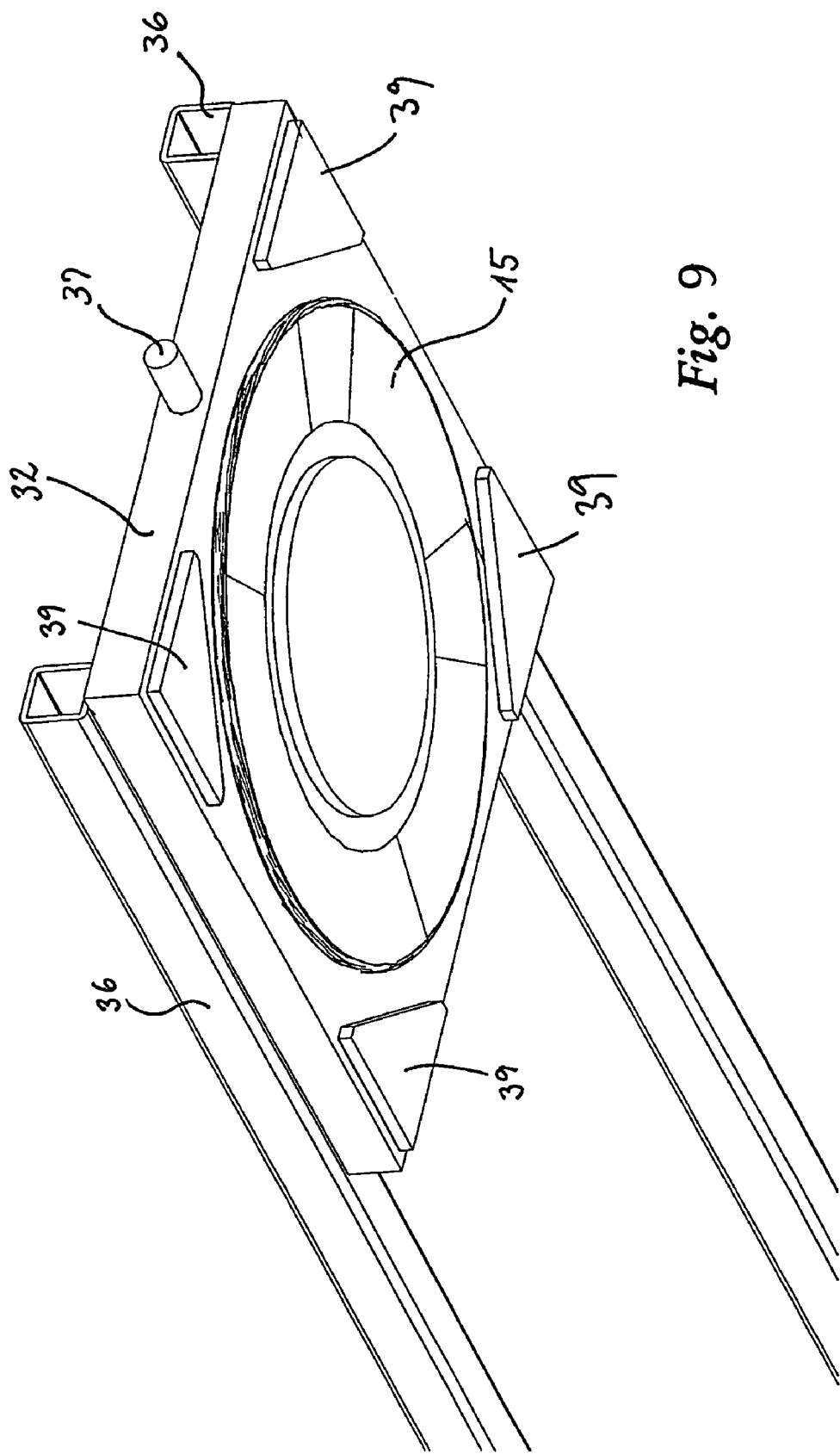
FIG. 9 shows one of the displacement members of FIG. 7 in a lowered state, viewed from below.

FIG. 9 shows one end of the supportive member 30 in FIGS. 7-8 seen from below. The carrier 32 is provided with four feet 39 for carrying the load when the air cushion element 15 is deflated, and the carrier with the framework sinks to rest on the floor.

Figure 10:
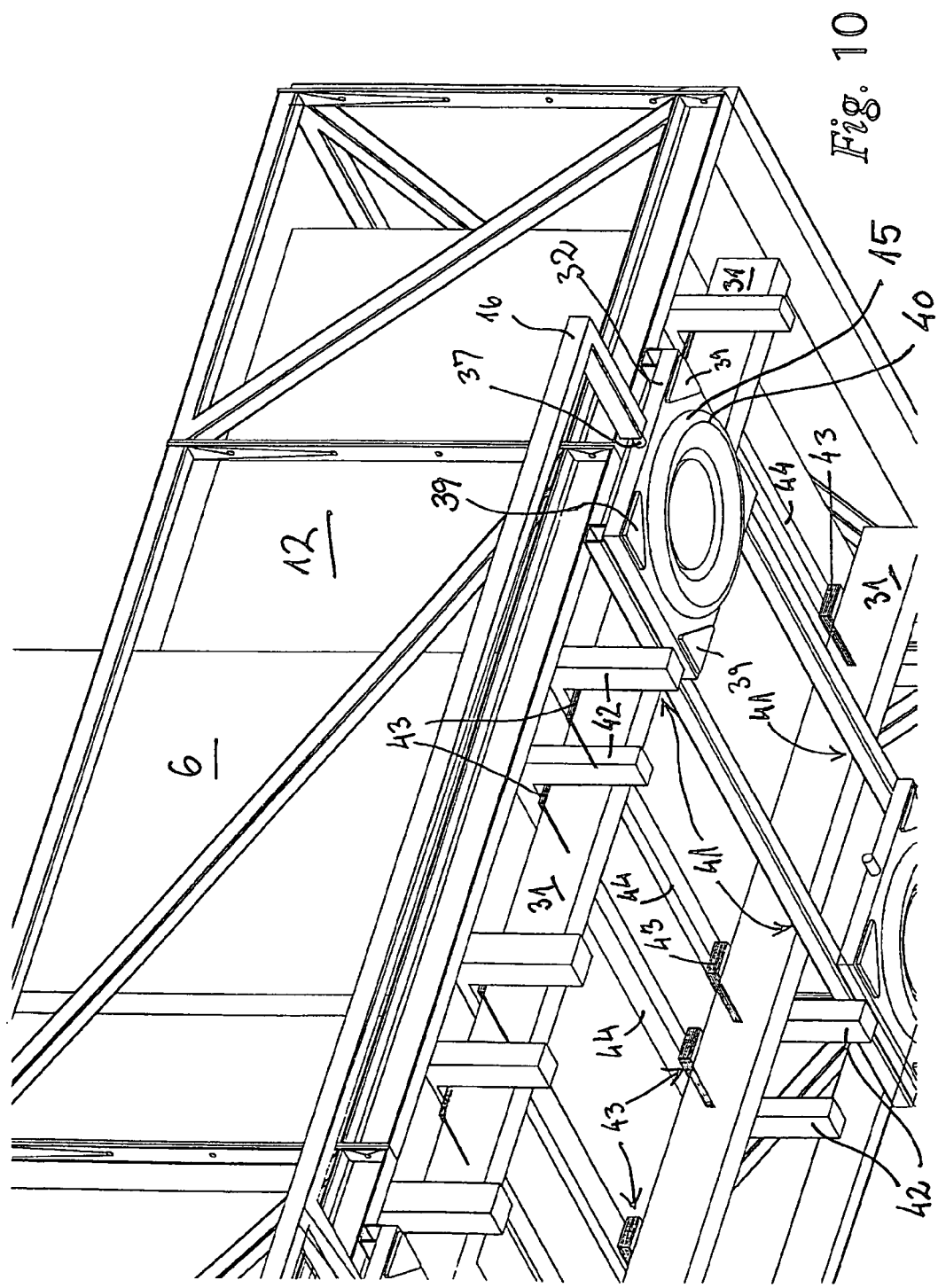
FIG. 10 shows the displacement member of FIG. 9 in a lifted state, viewed from below, as well as beams and shims supporting various objects in the processing line of FIG. 1.

FIG. 10 is a similar view as FIG. 9, but showing a little more of the surroundings of the carrier 32, and with the air cushion element 15 in its inflated state where the compressed air fed into the air cushion element via the air manifold 16 and the air inlet socket 37 will support the load and will be escaping below the "edge" 40 of the air cushion element extending closest to the floor, thereby forming the air film which practically eliminates friction.

FIG. 10 further shows (part of) the framework and (part of) the load, that is, the group 1 of objects to be moved. It is thus illustrated that the beams 31 rest on the lower cross members 36 at places 41, and that the objects to be seen in FIG. 10—that is, objects 6 10 and 12—are supported from the beams 31 by means of shims 43.

The use according to the invention of shims 43 in these places 41 provides for a very precise support of the objects 2-12 to be moved, so that the stiffness of the framework 14 and the beams 31 are utilised for keeping the objects 2-12 in precise and unchanged positions relative to each other, that is, the objects 2-12 do not displace, twist, bend, or otherwise move relative to each other, whereby the probably very fragile interconnections between the objects are not stressed in any way, and all tubing, wiring, etc. interconnecting the objects are not affected at all by the movement.

In FIG. 10, the shims 43 are placed between the beams 31 and parts 44 of the substructure of the objects 6 and 12 shown in FIG. 10, where these parts 44 form interconnecting legs 42 of the objects. In this way, the beams 31 act as both parts of the framework 14 and as blocking (that is, blocks, beams, planks, chocks, etc.) filling out the distance in height between the framework and the objects 2-12 to be moved. Fine adjustment is then made by placing shims between the beams and the objects.

By using shims in this way, another advantage is achieved in that it will be possible to assess the loading on each of the places 41 of support by simply twisting one of the shims 43. If twisting—or otherwise moving—one of the shims in each stack of shims requires the same torque or force, respectively, the probability of the loading being equal will be rather high. An equal loading on each place 41 of support will significantly contribute to keeping the objects 2-12 in precise and unchanged positions relative to each other, as mentioned above.

The particular arrangement of shims 43, etc., shown in the drawings is solely meant as an example, as substructures of objects to be moved together tend to be arranged in a vast multitude of manners.

The building of a suitable supporting structure from beams, blocks, shims, etc., will thus have to be tailored on a case-to-case basis; the person skilled in the art will be able to do this on the basis of the exemplary embodiments described herein. When working the invention, each of the objects is supported as evenly as possible and in a state of equilibrium with the rest of the objects in the group 1 of objects to be moved.

In cases where the free height below the objects 2-12 is limited, other embodiments of the method according to the invention (alternatives to the one disclosed above) may be more suitable.

As a first alternative, the beams or planks 31 may be dispensed with, and the objects supported by the lower cross members 36 directly, via appropriate shims, etc, as required. By this measure, less clearance will be required below the objects 2-12, as room (height) for the beams or planks 31 will not have to be provided for.

The pay-off for this embodiment is that the cross members will have to be dimensioned for a somewhat greater load, and/or more cross members will have to be used, as no load distribution is now had from the beams or planks.

As a second alternative, the displacement members may not be placed below the cross members in the first place. A preferred make of air cushions take up a height of 57 mm, and by placing the cross members directly on the floor at the beginning, the framework may now be assembled around a group of objects having a 57 mm smaller free height.

The pay-off for this is that the framework will have to be lifted in a separate step, in order that the displacement members may be placed below the cross members in the manner disclosed above.

This lifting of the framework may readily be performed using commercially available jacks, preferably hydraulic jacks which may be interconnected into three groups so as to provide a virtual three-point suspension. A quite low number of jacks, say, three to six may be adequate, thanks to the intrinsic stiffness and rigidity of the framework. When the framework has been lifted more than 57 mm (in the case of the above-mentioned air cushions), the displacement members may be put under the cross members and the framework lowered onto these.

These two alternative embodiments may be combined in order to be able to lift a group of objects with a very little free height below the objects.

In a third alternative embodiment of the invention, the carriers 32 with air cushions 15 are situated between two lower cross members 36 and are preferably made slidable on these; please refer to FIG. 11, which is a similar view as FIG. 7.

In FIG. 11, the activatable displacement member 15—in the form of an air cushion—has now been situated between the two lower cross members 36, and thus occupies no extra height relative to the cross members alone.

Lifting forces are being transmitted from the air cushions 15 to the cross members 36 by means of alternative embodiments of the carrier 32.

Two alternative embodiments of the carrier 32 are in fact illustrated in FIG. 11. The carrier 45 over the foremost air cushion 15 has been made as a heavy, rectangular piece of steel sheet with six bends at right angles. The carrier 46 over the rearmost air cushion 15 has been welded from a rectangular (almost square) piece of steel sheet and two lengths 51 of square steel tubing, fitting over (around) the lower cross members 36.

Both carriers 45 and 46 are made with a loose fit on the lower cross members 36, and the air cushions 15 are a loose fit in the carriers. This design enables the carriers 45 and 46 to be readily slidable on the lower cross members 36, and the air cushions 15 may be put into the carriers 45, 46 subsequent to the assembly of the framework, including, e.g., the carriers 45, 46.

By these measures, the carriers 45, 46 are made movable on the lower cross members 36, together with their associated air cushions 15.

The carrier 45 has been made from a rectangular piece of steel sheet, its short side having a length corresponding to the side length of the air cushion 15. Outside of a square central section, corresponding in size to the air cushion (which is square in this embodiment of the invention), the steel sheet has been bent downwardly for a distance corresponding to the height of the air cushion, and then horizontally outwards, forming a sort of claw 47, capable of carrying the lower cross member 36 with its load. Finally, the claws are bent upwards outside the dimension of the lower cross member 36, forming rims 48, securing the lower cross members in place.

The carrier 46 has been made from two lengths 51 of square steel tubing having a loose fit around the lower cross members 36 and thus readily slidable thereon. The two tube lengths 51 are interconnected by a rectangular piece of steel sheet 50, having a short side dimension corresponding to the side dimension of the air cushion. The long side dimension is ample to cover the two lengths 51 of tubing together with the air cushion.

Depending on dimensions and on the particular conditions on the working site, a gap 52 may form between the air cushion and the carrier. This gap may be eliminated by blocking or shimming.

In fact, such blocking or shimming may readily be utilised for lifting the entire framework in a convenient manner. As the lifting capacity of air cushions is limited to, say, 25 mm, a greater lift may very well be desirable in order to, e.g., negotiate irregularities in the planarity of the floor.

As the number of air cushions is very much smaller than the number of blocking or shimming points below the objects in the group of objects to be moved, it will be far more convenient to shim only the air cushion carriers 45, 46.

To do so, the air cushions are lifted to their maximum height, and the framework is blocked up; blocking in a few places will suffice, say, four or six places, due to the stiffness of the framework.

The air cushions 15 are then deflated, and they will sink down, leaving spaces 52 above each air cushion 15. When these spaces are properly blocked and shimmed, the framework may readily be lifted to a greater height, as desired.

The use of the carriers "eliminates" the height of the air cushions (e.g., 57 mm), because they are placed between the lower cross members 36, which have to be placed below the load in any case.

The use of the carriers 45, 46 also provides for a possibility for exchanging an air cushion during use, in case of a defect, and for the possibility of shifting the air cushion along the lower cross members 36 in cases where the load in not symmetrical with respect to the longitudinal centre line of the framework. If, for example, the framework is very heavily loaded with objects in a first side and very lightly loaded in a second side, the air cushion in the second side may be shifted to or towards the first side, in order to obtain a (more) equal loading of the air cushions.

In FIG. 11, the lower cross members are shown shorter than their actual length, for the sake of clarity. They will of course extend beyond each carrier 45, 46 in order to provide some free length for being fastened to the framework.

When the framework with the suspended group of objects is to be subjected to further transportation, that is, transported by, e.g., truck or ship, the objects can be secured to the framework in a manner to withstand greater forces, and in particular forces acting in horizontal or inclined directions.

The person skilled in the art will be able to propose such securing; an adequate form of securing will be tying the objects down by means of adjustable lashings, preferably from the top of each object to the lower rails of the framework. It will be adequate to oversize the lower cross members 36 in this case, as they will have to withstand the lashing force in addition to the weight of the objects as well as dynamic loads from the objects.

According to an exemplary embodiment of the invention, a framework for this kind of transportation may preferably be made in a manner providing it with ample stiffness and rigidity in horizontal directions, such that sideways lashing or other support may be made between the objects and upper portions of the framework as well.

When further transporting is to be made in standard freight or shipping containers, the framework according to the invention will preferably be made having such dimensions that it will fit into such a container in a manner convenient with respect to being brought into and out from, and being fastened inside the container in simple and effective manners.

According to another exemplary embodiment of the invention, the container may be provided in this respect with a smooth floor, preferably connectible with a smooth extension to the floor, extending outside the container and providing ample floor space for lowering the framework onto the floor extension from a crane or similar. The framework may then be slid into the container, utilising the activatable displacement members, e.g. air cushions.

FIG. 12 shows an irregularity 53 in the supporting surface, the irregularity 53 filled with a dry powder 54 and covered with a solid sheet 55. In exemplary embodiments, an irregularity 53 is an indentation in the supporting surface, as shown in FIG. 3. In exemplary embodiments, the supporting surface is a floor. A dry powder 54 fills the irregularity 53. In exemplary embodiments, the dry powder 54 can comprise sand, gravel, and/or another type of dry powder. The dry powder 54 fills the irregularity 53 and is smoothed out evenly along the supporting surface and covered with a solid sheet 55. In exemplary embodiments, the solid sheet 55 comprises an iron sheet.

FIG. 13 shows a connective member 56 for use when lifting the framework during transportation. In exemplary embodiments, the connective member 56 can comprise a ring bolt, a lifting eye, and/or a similar device for receiving a crane hook or similar lifting tackle.

FIG. 14 shows a container 57 for use during transportation of the group of objects. In exemplary embodiments, the container 57 is a standard freight or shipping container for use in shipment by road or by sea.

Another embodiment of the method according to the invention for loading a framework with a group of objects into a container comprises the following steps:

1. The framework, being suspended from a crane, four wires or chains of which are attached to the upper rail of the framework, is moved with a first end into a framework for as long as the wires will permit—say, 1 m;

2. A number, say, two, "dollies" (i.e., small, strong roller "bogies" or "transport rollers" having very sturdy wheels and a load-carrying upper face) are placed below the end of the framework now projecting into the container, and the other end is supported by blocks and/or shims;

3. The two crane wires or chains nearest to the container are disconnected and the framework is lifted by the remaining two wires or chains and pushed into the container. These two wires or chains may be connected to the framework at its end or at temporary extensions, so that the crane may move the framework all the way into the container without the wires or chains fouling the container roof;

4. A number, say, two dollies are placed below the outermost end of the framework;

5. It will now be possible to push the framework further into the container, using a fork-lift truck or similar; and 6. Finally, the framework must be secured inside the container by, e.g., lashing or packing. The skilled person will be able to propose adequate solutions, as mentioned above.

The container and the framework may preferably be fitted with standardised, matching, engagable fastening means, designed to withstand worst-case forces to be encountered during the transportation or form of transportation in question.

EXAMPLE NO. 1

A framework according to the invention was designed, having a length of 18 m, and equipped with four lifting eyes placed on the upper horizontal member of the framework long sides, 1.5 m from each end of each long side. Thus, a distance between two lifting eyes on one side was 15 m.

The design was based on the criterion that the framework should have ample stiffness to carry an evenly distributed load of 10 t with insignificant deflection. The framework was designed as built up from separate modular elements in a similar way as described above, all long side elements having a length of 3 m.

From these elements, a shorter framework was assembled, having a length of 9 m, and this framework was loaded with a group of objects weighing 6 t total.

When lifted by a crane in the four lifting eyes mentioned, the deflection was assessed not to be able to be seen with the naked eye when viewing in the direction of the bottom horizontal member, that is, less than 1 or 2 cm.

EXAMPLE NO. 2

Finite Element calculations were carried out on the modular long side elements described in example 1.

In one calculation, a framework was assembled from these 3 m long elements, the framework having a length of 9 m and being loaded with an evenly distributed load of 6 t. The framework was suspended in the four lifting eyes described in example 1.

The maximum downward deflection calculated was 0.76 mm, which is considered to be of no consequence whatsoever to a production line or similar, having a length of 9 m.

EXAMPLE NO. 3

Finite Element calculations were carried out on the modular long side elements described in example 1.

In one calculation, a framework was assembled from these 3 m long elements, the framework having a length of 18 m and being loaded with an evenly distributed load of 10 t. The framework was suspended in the four lifting eyes described in example 1, which were thus placed 15 m apart on each long side of the framework.

The maximum downward deflection calculated was 15.72 mm, which is considered to be of no practical consequence to a production line or similar, having a length of 18 m.

Even if the invention has been explained above with reference to air cushions as the only type of elements for enabling the loaded framework to be displaced horizontally on the floor, other types of support enabling sideways movement may be used instead of air cushions.

An example of such support is freely rotatable and swivelling wheels, as known on many transport trolleys and other vehicles for manual propulsion. Such wheels may be supported on the framework in a vertically displaceable manner, and displaced downwards to lift the framework from the floor.

It will be possible to displace the wheels downwards by means of hydraulic cylinders, and it will be possible to interconnect the hydraulic cylinders in three groups, thus obtaining a virtual three-point support of the framework in its lifted-up condition, and at the same time an efficient sharing of load between the wheels.

The swivel mechanism of some or all of the wheels may be adapted to be locked in one or more angular positions, thus enabling the framework to have, e.g., swivelling wheels in one end and fixed wheels in the opposite end like, say, an automobile. This feature will facilitate, e.g., steering of the framework along an intricate trajectory.

A drawback in the use of swivelling wheels is the resistance of such wheels against swivelling if the tread of the wheel is made from soft rubber or similar, and in particular if the tread is wide. This disadvantage may be diminished to some degree, however, by replacing each wheel with a group of more narrow, freely rotatable wheels, mounted side-by-side on the same axle.

The use of wheels may lead to problems when positioning heavy objects to narrow tolerances, especially when the wheels are turned with their direction of travel at a large angle to the direction of desired movement.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

LIST OF REFERENCE DESIGNATIONS

1 Group of objects;
   Production line
2 Machine
3 Machine
4 Machine
5 Machine
6 Machine
7 Interconnecting device
8 Interconnecting device
9 Interconnecting device
10 Interconnecting device
11 Interconnecting device
12 Interconnecting device
13 Floor
14 Framework
15 Displacement member
16 Air manifold
17 Air hose
18 Lower horizontal member
19 Upper horizontal member
20 Simple vertical post
21 Compound vertical post
22 Diagonal brace
23 Short side module
24 Medium side module
25 Long side module
26 End module
27 Bottom horizontal member
28 Top horizontal member
29 End post
30 Supportive member
31 Beam
32 Carrier
33 First long side
34 Second long side
35 End side
36 Lower cross member
37 Air socket
38 Air manifold tubing
39 Foot
40 Edge
41 Place of support
42 Leg
43 Shims
44 Substructure part
45 Carrier
46 Carrier
47 Claw
48 Rim
49 Carrier plate
50 Carrier plate
51 Tube
52 Space
53 Irregularity
54 Dry powder
55 Solid sheet
56 Connective members
57 Container

What is claimed is:

1. A method for moving a group of objects while conserving the positions of the objects relative to each other, comprising the steps of:

providing a group of objects, the objects being arranged in fixed positions relative to each other on a generally planar supporting surface and depending on the support by the supporting surface for maintaining their relative positions, providing a rigid framework, generally extending into the vicinity of the objects, the framework comprising a plurality of supportive members configured to support each object in the group of objects that is not supported in full by other of the objects, the supportive members comprising elongate cross members generally extending across an entire width of the framework and disposed in a position under the objects to be moved to support the objects to be moved;

providing activatable displacement members coupled to the framework for lifting and supporting the framework from the supporting surface and enabling displacement of the framework along the surface;

establishing supportive contact between each object in the group of objects that is not supported in full by other of the objects and corresponding supportive members on the framework;

lifting the framework supporting the objects as one rigid unit by activating the activatable displacement members; and moving the framework with respect to the supporting surface, wherein the framework maintains the position of the group of objects relative to each other during said moving step.

2. A method according to claim 1, wherein the group of objects forms a single unit assembled from the objects, wherein the single unit depends on the supporting surface for maintaining its structural integrity and stiffness.

3. A method according to claim 1, wherein the framework generally surrounds the group of objects.

4. A method according to claim 1, wherein the framework comprises a four-sided frame encompassing the group of objects.

5. A method according to claim 1, wherein the framework comprises an assembly of modular framework units.

6. A method according to claim 1, wherein establishing the supportive contact comprises the step of inserting at least one of blocks and shims between each of the objects and the corresponding supportive members.

7. A method according to claim 1, wherein the step of establishing supportive contact comprises lifting the framework via the activatable displacement members before establishing the supportive contact.

8. A method according to claim 1, wherein the activatable displacement members are deactivated after the establishing of the supportive contact, following which a level of the framework relative to the activatable displacement members is adjusted.

9. A method according to claim 1, wherein the activatable displacement members comprise air cushion elements.

10. A method according to claim 1, further comprising the steps of filling irregularities in the supporting surface with a dry powder and covering the irregularities with a solid sheet of material prior to moving the framework across the irregularities.

11. A method according to claim 1, wherein said moving step further comprises the step of transporting the framework, and wherein objects in the group of objects are secured to the framework prior to said transporting step.

12. A method according to claim 11, wherein dimensions of the framework are adapted to dimensions of a freight container, and wherein the framework with the group of objects is secured to the container for transportation.

13. The method according to claim 11, wherein said moving step further comprises the step of securing the framework within a container for transporting the framework via truck.

14. The method according to claim 11, wherein said moving step further comprises the step of securing the framework within a container for transporting the framework via ship.

15. The method according to claim 1, wherein the cross members comprise an upper surface contacting a bottom surface of side rails of the framework.

16. The method according to claim 1, wherein each activatable displacement member comprises an air cushion disposed between two cross members and thus not occupying any extra height relative to the cross members alone.

17. The method according to claim 1, further comprising beams disposed upon the supportive members and extending lengthwise within the framework to form an intermediate blocking between the supportive members and the objects to be moved.

18. The method according to claim 17, further comprising shims disposed on top of the beams, wherein the objects rest on a top surface of the shims.

19. The method according to claim 1, wherein each supportive member comprises two carriers as the activatable displacement members and two cross members, and wherein each of the carriers comprises an air cushion on its lower side facing the supporting surface and an air inlet socket on one of its sides.

20. The method according to claim 19, further comprising an air manifold that supplies air to the displacement members to provide an ample supply of compressed air to air cushions of the displacement members.

21. The method according to claim 20, wherein the air manifold comprises tubing connecting to an air hose, the air hose being connected to a suitable supply of compressed air.

22. A system for moving a group of objects while conserving positions of the objects relative to each other, comprising:
a group of objects, the objects being arranged in fixed positions relative to each other on a generally planar supporting surface and depending on the support by the supporting surface for maintaining their relative positions;
a rigid framework comprising a four-sided frame encompassing the group of objects;
a plurality of supportive members disposed adjacent to at least a portion of said framework to support each object in the group of objects not supported in full by other of the objects, said supportive members comprising elongate cross members generally extending across an entire width of the framework and disposed in a position under the objects to be moved to support the objects to be moved; and
activatable displacement members coupled to the system to lift and support said framework from the supporting surface and enabling displacement of the system along the supporting surface,
wherein said framework maintains the position of the group of objects relative to each other during displacement of the system with respect to the supporting surface.

23. The system according to claim 22, wherein said framework comprises an assembly of modular framework units.

24. The system according to claim 22, wherein said supportive members can be coupled to said framework in various desired positions.

25. The system according to claim 22, wherein said supportive members are adjustable as to at least one of their form, reach, and direction relative to said framework.

26. The system according to claim 22, further comprising filling material that establishes the supportive contact between the objects and said supportive members.

27. The system according to claim 26, wherein said filling material comprises at least one of blocks, beams, and shims.

28. The system according to claim 22, wherein said activatable displacement members can be coupled to said system by being fitted onto said framework in various desired positions.

29. The system according to claim 22, wherein said activatable displacement members are coupled to said system by being mounted below said supportive members.

30. The system according to claim 22, wherein a vertical position of said activatable displacement members relative to said framework is adjustable.

31. The system according to claim 22, wherein said displacement members comprise air cushion elements and a system that supplies compressed air to said air cushion elements.

32. The system according to claim 22, further comprising connective members coupled to said framework via which said framework can be lifted for further transportation.

33. The system according to claim 22, wherein the cross members comprise an upper surface contacting a bottom surface of side rails of the framework.

34. The system according to claim 22, wherein each activatable displacement member comprises an air cushion disposed between two cross members and thus not occupying any extra height relative to the cross members alone.

35. The system according to claim 22, further comprising beams disposed upon the supportive members and extending lengthwise within the framework to form an intermediate blocking between the supportive members and the objects to be moved.

36. The system according to claim 35, further comprising shims disposed on top of the beams, wherein the objects rest on a top surface of the shims.

37. The system according to claim 22, wherein each supportive member comprises two carriers as the activatable displacement members and two cross members, and wherein each of the carriers comprises an air cushion on its lower side facing the supporting surface and an air inlet socket on one of its sides.

38. The system according to claim 37, further comprising an air manifold that supplies air to the displacement members to provide an ample supply of compressed air to air cushions of the displacement members.

39. The system according to claim 38, wherein the air manifold comprises tubing connecting to an air hose, the air hose being connected to a suitable supply of compressed air.

* * * * *